United States Patent Office 3,089,317
Patented May 14, 1963

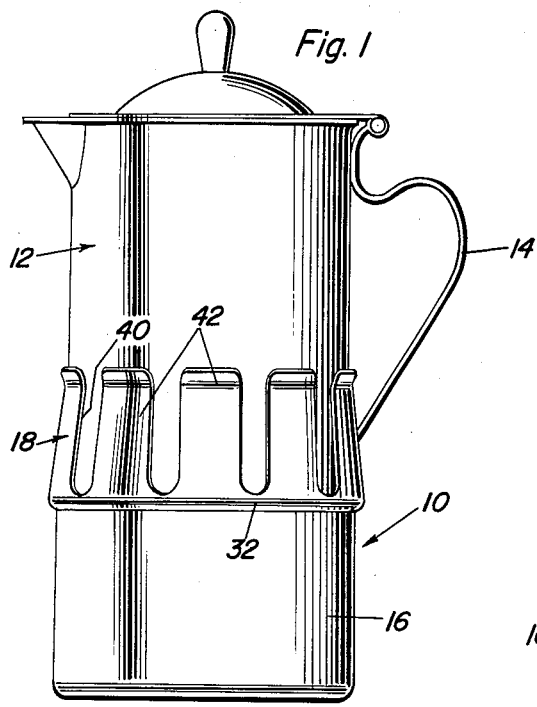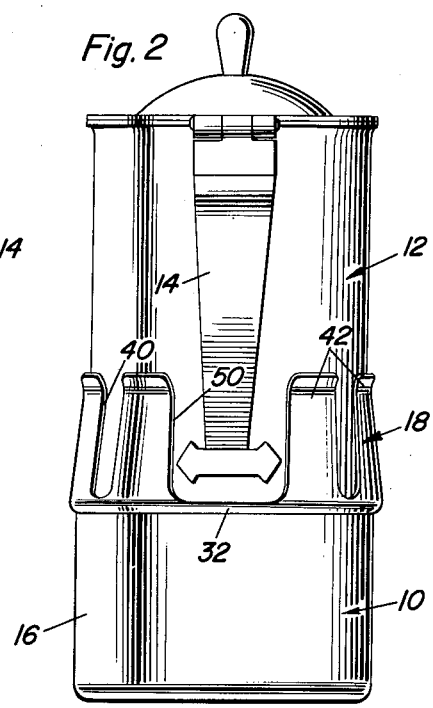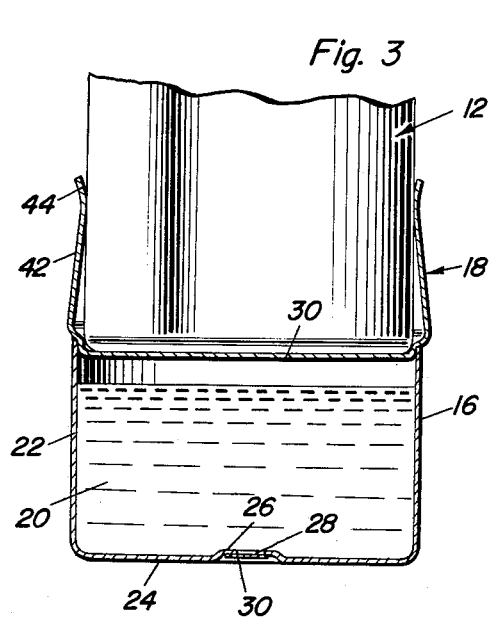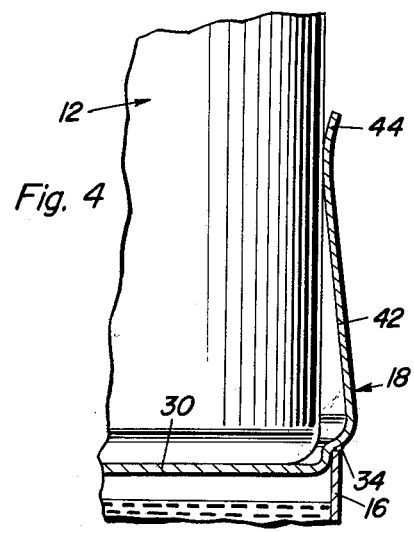
Charles J. Bufalini
INVENTOR.

3,089,317
HEAT EXCHANGING ATTACHMENT FOR
RECEPTACLES
Charles J. Bufalini, Pico-Rivera, Calif.
(North Hollywood, Calif.)
Filed Aug. 5, 1960, Ser. No. 47,749
1 Claim. (Cl. 62—457)

This invention comprises a novel and useful heat exchanging attachment for receptacles and more particularly relates to an attachment adapted to be readily and detachably engaged upon the lower ends of receptacles and functioning to chill the contents of the receptacles and maintain them in a cooled condition for long periods of time.

It is frequently desirable, both from the standpoint of satisfying the desire of the user as well as for purposes of sanitation to maintain the contents of certain receptacles such as cream pitchers, cooled drinks and the like in a chilled condition for relatively long periods of time. It is also desired to attain the foregoing condition without the necessity for diluting the liquid being chilled by reason of the melting of the coolant therein, as for example when ice cubes or the like are employed.

It is therefore the primary purpose of this invention to provide a means which will effect the foregoing purposes in a convenient cleanly and sanitary manner.

A further object of the invention is to provide a chilling attachment adapted to be readily engaged upon receptacles such as glasses, pitchers, pots and the like in such a manner as to readily support the receptacle thereon; to be securely attached to the receptacle but easily separated therefrom when desired; which will maintain a good heat exchange relation between the cooling device and the receptacle; and which shall have proper provision for engaging different sizes of receptacles and for accommodating different handle contours of the receptacles.

Still another object of the invention is to provide a heat exchanging attachment which shall be provided in a sealed container forming a part thereof a eutectic material such as water or other suitable substance which may be previously heat conditioned either by chilling if the same is to function as a cooler for a receptacle or by heating if it is to function as a means for maintaining the contents of a receptacle in a heated condition, in readiness for its use, and which may be readily applied to or removed from a conventional receptacle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing one preferred embodiment of a heat exchange attachment in accordance with this invention shown applied to a receptacle such as a cream pitcher, or a coffee pot or the like;

FIGURE 2 is a side elevational view taken from the right end of FIGURE 1 and showing the disposition in the attachment for receiving the handle of the receptacle being serviced by this attachment;

FIGURE 3 is a detail view in vertical section through the attachment and showing certain details of the structure of the same and the fastening means by which the receptacle is secured to a container for servicing the same; and FIGURE 4 is a further detail view similar to FIGURE 3 but taken upon an enlarged scale and showing the manner in which the fastening means of the device is secured to the eutectic material container.

In the accompanying drawings, the numeral 10 designates generally the heat exchange attachment in accordance with this invention which is shown applied to any suitable type of receptacle such as a pitcher 12 having a handle 14 thereon. Although the attachment has been shown as applied to a pitcher it is to be understood that it may be likewise applied to receptacles of all characters such as cans, bottles or the like wherever it is desired to maintain the contents of such receptacle in either a chilled or in a heated condition for a considerable period of time. It is within the purview of this invention to utilize the attachment either as a heater or as a cooler for the contents of receptacles to which the device is attached, but for simplicity of illustration and description it will be assumed hereinafter that the receptacle 12 is one whose contents are to be maintained in a chilled or refrigerated condition, as for example cream or the like.

The heat exchange attachment 10 consists of a lower portion comprising a container 16 together with an upper portion 18 which constitutes a fastening means by which the container is detachably secured to the receptacle 12. The container 16 has sealed therein a body of a eutectic material as at 20 which could be of various desired characters, as for example it may consist of water or other liquids. It is desired that the material shall have a relatively high specific heat in order that it may afford a relatively considerable reservoir for the storage of heat or for receiving heat depending upon the nature of its use.

The container 16 as illustrated preferably comprises a cylindrical side wall 22 which is open at its upper edge together with an integral closed bottom wall 24 having a centrally raised portion 26 therein. This centrally raised portion is provided with a filling opening 28 by means of which the material 20 may be charged into the container or replenished if the occasion should arise. This opening is preferably substantially permanently sealed as by a closure plug 30 which may be in the form of a metallic strip or disk which is received completely within the external recess formed by the raised portion 26 and is soldered or otherwise united with the raised portion to form a closure for the opening 28.

The material of the container 16 will be so chosen as to be substantially proof against corrosion by the contents of the container, capable of giving a good heat exchange relation between the interior of the container and the receptacle 12 to which the container is to be attached, and capable of having a relatively long life.

The fastening means 18 consists of a good heat exchange material and includes a bottom wall 30 which at its periphery is provided with an upstanding rim or skirt 32, shown best in FIGURES 1 and 2, the member 30 constituting the top wall for the container 16.

Observing more closely FIGURE 4 it will be observed that the periphery of the wall 30 is provided with a peripheral groove or channel as at 34 in which the upper edge or end of the side wall 16 is received and to which the side wall is secured as by soldering or in any other suitable manner to obtain a fluid-tight joint therebetween. The main portion of the bottom wall 30 thus extends within the upper edge of the side wall 16 and forms the closure for the container as previously mentioned as well as constitutes a bottom upon which is supported and upon which rests in good heat exchange relation the bottom wall of the receptacle 12.

The upstanding rim 32 is provided with a plurality of downwardly extending notches as at 40 which define therebetween a plurality of fingers 42. The upper ends of these fingers are slightly outturned as at 44, see FIGURE 4, and thus provide a guiding means which assists in positioning the fastening means upon the lower end of the receptacle 12. Preferably the material of which the fastening means is composed is of a resilient nature so that the fingers 42 have an inherent resiliency imparted thereto. As will be further observed from FIGURE 4, the fingers from their outturned upper ends 44 are inclined downwardly and outwardly towards their junction with the periphery of the base plate 30 of the fastener to thus effect a resilient gripping action of the fingers upon the wall of the receptacle. This gripping action may be varied from time to time in order to enable the device to accommodate itself to different sizes and types of receptacles as by further imparting a permanent different bent to the fingers.

In order that the device may be utilized with receptacles having handles of various characters, it will be observed from FIGURE 2 that the rim 32 is provided between two of the fingers 42 with a relatively wider recess or cutaway portion as at 50 of sufficient size to accommodate different contours of the handles 14 with which the receptacles 12 may be provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as defined in the claims which follow.

I claim:

A heat exchange attachment for a receptacle having a flat bottom wall, including:

(a) a container having a eutectic material sealed therein;

(b) said container including a cup open at its top;

(c) said cup having a bottom wall provided with a filling opening;

(d) a closure sealing said filling opening;

(e) said container including an imperforate top wall having a flat, depressed central portion extending downwardly into said cup and adapted to have the flat bottom wall of the receptacle seated thereon in good heat exchange relation;

(f) said top wall having a circumferential shoulder encircling said depressed central portion and seated on the rim of said cup and secured thereto in fluid-tight relation;

(g) said top wall including an integral skirt extending upwardly from its periphery;

(h) said skirt being downwardly notched at circumferentially spaced points to provide a plurality of circumferentially spaced, upstanding, resilient fingers adapted to grip the receptacle when the bottom wall thereof is seated on the depressed central portion of said top wall; and (i) two of said fingers being spaced apart farther than the remainder of said fingers to receive therebetween a handle on the receptacle.

References Cited in the file of this patent

UNITED STATES PATENTS

| | | |
|---|---|---|
| 551,547 | Howard | Dec. 17, 1895 |
| 1,741,337 | Purcell | Dec. 31, 1929 |
| 1,771,186 | Mock | July 22, 1930 |
| 1,835,463 | Campbell | Dec. 8, 1931 |
| 2,767,563 | Picascia | Oct. 23, 1956 |